United States Patent [19]
Greenwald et al.

[11] 3,872,426
[45] Mar. 18, 1975

[54] AUDIBLE EMERGENCY WARNING SIGNAL DEVICE FOR AN AIR BRAKE SYSTEM

[76] Inventors: Lewis E. Greenwald, 44 Logan St.; Carl V. Greenwald, 236 W. Eight St., both of Peru, Ind. 46970

[22] Filed: Jan. 17, 1974

[21] Appl. No.: 434,016

[52] U.S. Cl. .......... 340/52 C, 200/83 R, 188/151 A
[51] Int. Cl. .......................................... G08b 21/00
[58] Field of Search ....... 340/52 C, 52 B; 200/83 R; 188/1 A, 151 A

[56] References Cited
UNITED STATES PATENTS
3,394,345 7/1968 Thomas............................ 340/52 C
3,494,198 2/1970 Kaminky et al.............. 200/83 R X Primary Examiner—Alvin H. Waring
Attorney, Agent, or Firm—James W. Pearce; Roy F. Schaeperklaus

[57] ABSTRACT

A warning signal for an air brake system. A diaphragm is mounted in a housing for movement across a cavity in the housing. A main air line of the brake system is connected to the cavity on one side of the diaphragm. Pressure in the line urges the diaphragm against a wall of the cavity. An actuator member is attached to the diaphragm and is urged in a direction to advance the diaphragm to the other wall of the cavity when the pressure in the line falls below a predetermined pressure. A switch which actuates the signal, is connected to the actuator to be actuated when the diaphragm moves across the cavity.

2 Claims, 3 Drawing Figures

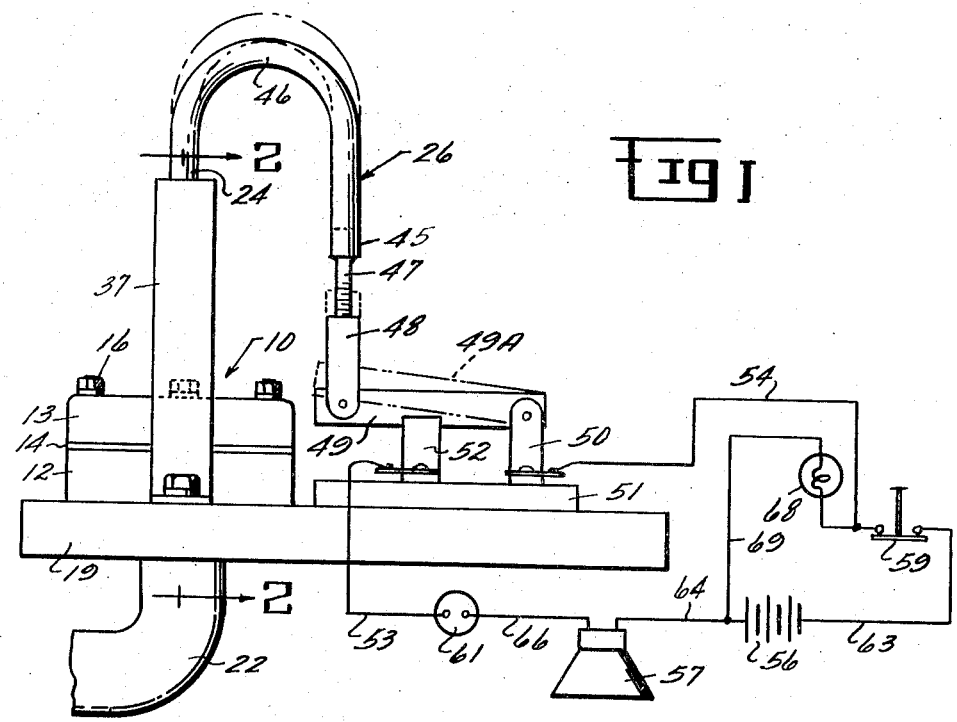
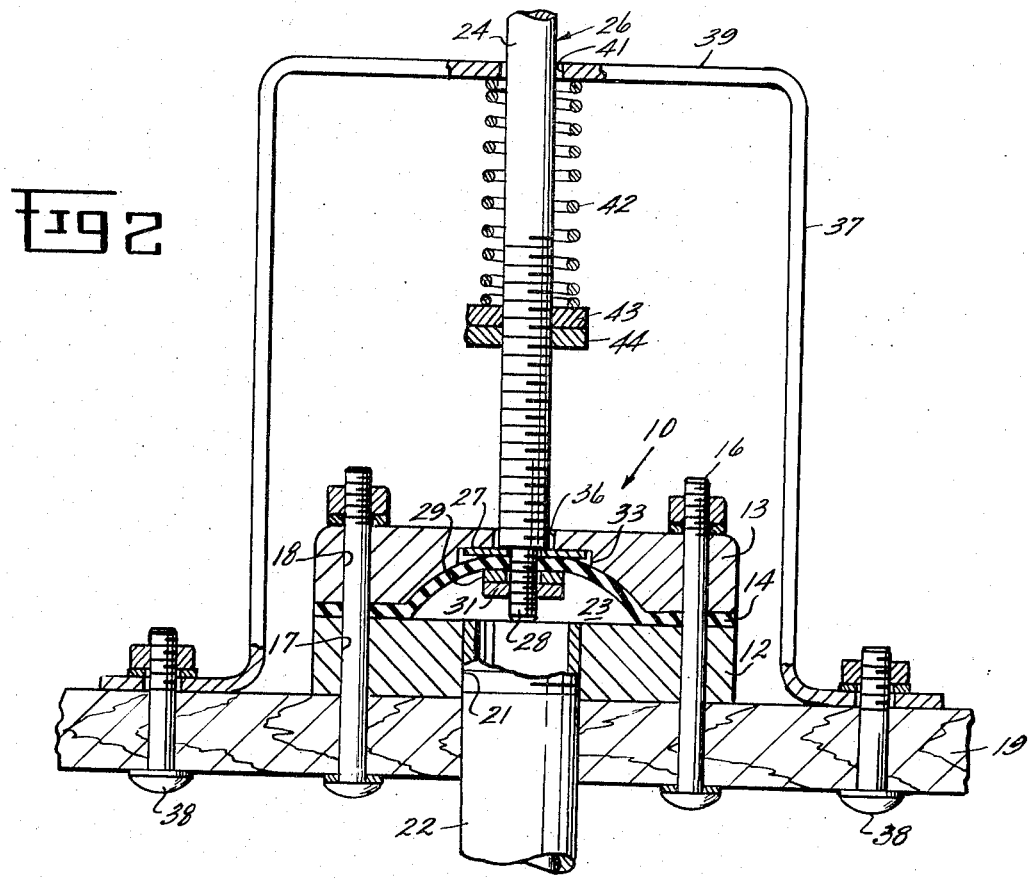

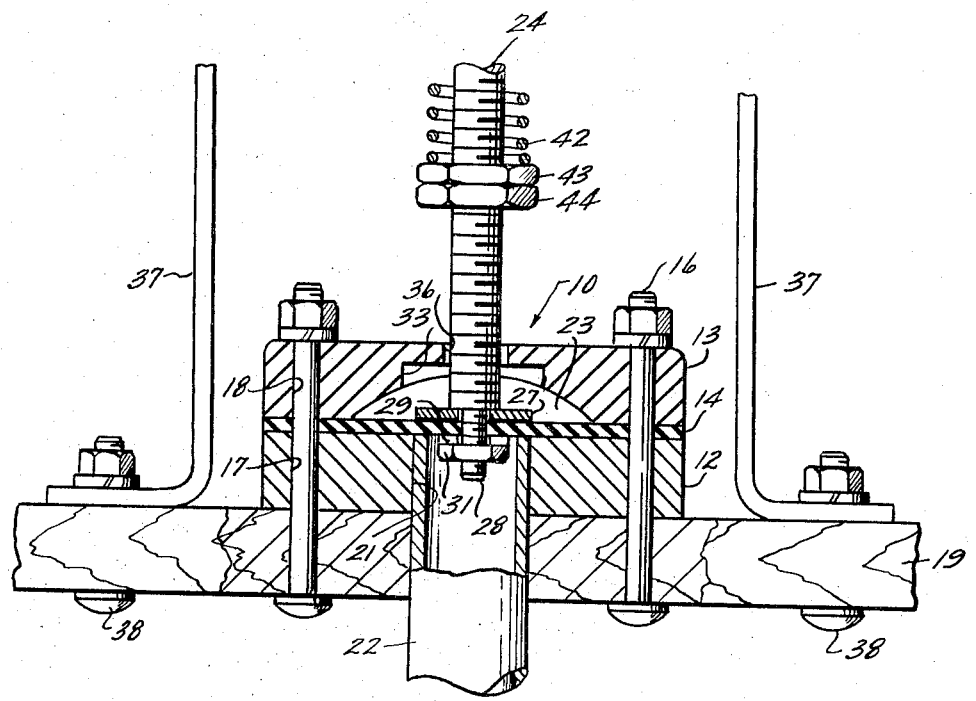

AUDIBLE EMERGENCY WARNING SIGNAL DEVICE FOR AN AIR BRAKE SYSTEM

This invention relates to a warning device for an air brake system.

When there is a sudden drop in the pressure in a main air line of an air brake system of a train or the like, brakes are abruptly set and the train is suddenly brought to a stop. Unless train personnel, particularly those in a caboose of the train, have warning when the pressure drops, they may not have time to protect themselves from the effects of the sudden stop.

An object of this invention is to provide a device which sounds a warning when the pressure in the main air line of an air brake system falls below a predetermined level.

A further object of this invention is to provide such a device which produces a readily identified interrupted audible warning signal when the pressure drops.

Briefly, this invention provides a warning device for an air brake system which includes a diaphragm mounted in a housing which is connected to a main pressure line of an air brake system on one side of the diaphragm. The diaphragm is urged against the pressure line with a predetermined pressure so that, when the pressure in the pressure line exceeds a predetermined pressure, the diaphragm is advanced away from the pressure line. A switch operator is connected to the diaphragm, and an electric switch is actuated when the diaphragm moves. When the pressure in the pressure line falls below the predetermined value, the diaphragm moves back to the position adjacent the pressure line, and the switch is actuated to sound a warning device.

The above and other objects and features of the invention will be apparent to those skilled in the art to which this invention pertains from the following detailed description and the drawings, in which:

FIG. 1 is a view in side elevation of a warning system for an air brake constructed in accordance with an embodiment of this invention, electric wiring of the system being shown schematically in association therewith, a switch being shown in dot-dash lines in open position;

FIG. 2 is a view in section taken on a line 2—2 in FIG. 1 with a diaphragm of the system being shown in its position when pressure is in the air brake system; and FIG. 3 is a view in section taken on the same line as FIG. 2 but showing the diaphragm in its de-pressurized position.

In the following detailed description and the drawing, like reference characters indicate like parts.

In FIG. 1 is shown a warning device constructed in accordance with an embodiment of this invention. The warning device includes a housing 10 including a lower diaphragm housing section 12 and an upper diaphragm housing section 13 between which is mounted a flexible diaphragm 14. Bolts 16, which extend through upright bores 17 and 18 (FIGS. 2 and 3) in the lower and upper housing sections 12 and 13, respectively, hold the housing sections and the diaphragm 14 in assembled relation mounted on a support board 19.

An upright threaded bore 21 in the lower housing section 12 receives the upper end of a pipe 22, which is connected to a main air pressure line of an air brake system, not shown in detail. The pipe 22 is in communication with one side of the diaphragm 14. The upper housing section 13 is provided with a dome shaped cavity 23, and the diaphragm 14 can be pressed against the wall of the cavity 23 when the diaphragm 14 is deformed upwardly by air pressure in the pipe 22, as shown in FIG. 2.

The central portion of the diaphragm 14 is attached to the lower end of an upright arm 24 of an inverted U-shaped actuator 26. A large washer 27 is mounted on a downwardly extending threaded tip 28 of the arm 24 and overlies the mouth of the pipe 22. A washer 29 and a nut 31 threaded on the tip 28 hold the diaphragm 14 in position thereon. When the diaphragm 14 is in depressurized position, as shown in FIG. 3, the washer 29 and the nut 31 are received inside the mouth of the pipe 22, and the large washer 27 overlies the mouth of the pipe 22 to hold the diaphragm thereagainst. When the diaphragm is in pressurized condition, as shown in FIG. 2, the large washer 27 is received in a socket 33 in the upper housing section 13 overlying the cavity 23. The arm 24 of the U-shaped actuator 26 extends through a central opening 36 in the upper housing section 13.

The U-shaped actuator 26 is steadied by a yoke 37 (FIG. 2) which is attached to the support board 19 on opposite sides of the housing 10 by bolts 38. The yoke 37 includes a cross bar 39 provided with an upright central opening 41 through which the arm 24 extends so that the opening 41 guides the arm 24. A compression spring 42 is mounted on the arm 24 underlying and engaging the cross bar 39. The spring 42 also bears on an adjustment nut 43 threaded on the arm 24. A locking nut 44 threaded on the arm 24 cooperates with the adjustment nut 43 to lock the adjustment nut 43 in selected position. The adjustment nut 43 can be turned to adjust the pressure with which the spring 42 resists air pressure in the pipe 22 to determine the pressure at which the diaphragm 14 moves from the FIG. 2 position to the FIG. 3 position.

A second arm 45 (FIG. 1) of the U-shaped actuator 26 extends downwardly from an upper cross portion 46 thereof and carries a threaded portion 47 on which a head 48 is mounted. The head 48 is pivotally connected to a switch blade 49. The switch blade 49, in turn, is pivotally mounted on an upright post 50 carried by a switch block 51. The switch block 51 is mounted on the support board 19 and also carries an upstanding switch contact member 52 which cooperates with the switch blade 49. When the switch blade moves from the dot-dash line position indicated at 49A at which the pipe 22 is provided with air under a pressure greater than the predetermined pressure to the full line position 49 at which the pressure in the pipe 22 is less than the predetermined pressure, the switch blade 49 makes electrical connection between a lead 53 attached to the switch contact member 52 and a lead 54 attached to the post 50.

A battery 56 powers a horn 57 when the switch blade 49 is closed. An on-off switch 59 and a circuit interrupter 61 are connected in series with the battery 56 and the horn 57. The on-off switch 59 connects the lead 54 to a lead 63, which is connected to one side of the battery 56. A lead 64 connects the other side of the battery 56 to one side of the horn 57. A lead 66 connects the other side of the horn 57 to the circuit interrupter 61. The other side of the circuit interrupter 61 is connected to the lead 53. A warning signal lamp 68 is in a line 69, which is connected between the leads 54 and 64, and the lamp 68 indicates that the on-off switch 59 is closed. The circuit interrupter can be of the type shown in U.S. Pat. No. 2,615,106 and causes an interrupted or intermittent blowing of the horn 57 when the pressure in the pipe 22 falls below the predetermined value.

As long as the pressure in the pipe 22 exceeds the predetermined amount, the diaphragm 14 is held in the FIG. 2 position, and the switch blade 49 (FIG. 1) is disconnected from the switch contact member 52 and is in the position shown in dot-dash lines at 49A. However, if the pressure in the pipe 22 falls below the predetermined amount, as when the main brake line is ruptured in an accident or the like or when the brakes are applied in a crisis situation, the diaphragm is moved to the FIG. 3 position by action of the spring 42 (FIG. 2), and the switch blade 49 advances to the full line position of FIG. 1 completing the circuit to sound the horn 57. The circuit interrupter 61 causes the horn 57 to sound intermittently so that the horn signal is clearly identifiable. The warning device gives an immediate audible warning when the pressure in the pipe 22 drops so that persons in a caboose can protect themselves against being tossed about inside the caboose as the brakes are set and the caboose is brought to a stop.

When the warning device is not needed, the on-off switch 54 can be opened to limit drain of the battery 56.

The warning device illustrated in the drawings and described above is subject to structural modification without departing from the spirit and scope of the appended claims.

Having described our invention, what we claim as new and desire to secure by letters patent is:

1. A warning device for an air brake system which comprises a diaphragm housing having a diaphragm cavity, a diaphragm mounted in the housing for movement in said cavity, means for connecting a main air line of the brake system to the housing in communication with the cavity on one side of the diaphragm, pressure in the line urging the diaphragm against one side of the cavity, an actuator member attached to the diaphragm and extending outwardly of the housing on the side of the diaphragm remote from the air line, a yoke overlying the housing, the actuator extending through an opening in the yoke, a compression spring mount on the actuator outside the housing and engaging the yoke, means on the actuator engaging the spring so that the spring urges the actuator member in a direction to advance the diaphragm to the other side of the cavity when the pressure in the line falls below a predetermined pressure, a switch connected to the actuator to be actuated when the diaphragm moves across the cavity, and an audible warning signal means connected to the switch to be actuated when the diaphragm is at the other side of the cavity to give an audible warning signal when the pressure in the line falls below the predetermined pressure.

2. A warning device as in claim 1 wherein the means on the actuator engaged by the spring is a nut threaded on the actuator, and the nut is adjustable along the actuator to adjust the pressure at which the diaphragm moves across the cavity.

* * * * *